(12) United States Patent
Stenberg et al.

(10) Patent No.: US 7,486,233 B2
(45) Date of Patent: Feb. 3, 2009

(54) METHOD AND SYSTEM OF POSITIONING

(75) Inventors: Per Anders Stenberg, Sollentuna (SE);
Mikael Bergenlid, Sollentuna (SE);
Johan Alteir-Tuvesson, Karlskrona (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 125 days.

(21) Appl. No.: 10/595,133

(22) PCT Filed: Sep. 3, 2003

(86) PCT No.: PCT/SE03/01368

§ 371 (c)(1),
(2), (4) Date: Mar. 2, 2006

(87) PCT Pub. No.: WO2005/022191

PCT Pub. Date: Mar. 10, 2005

(65) Prior Publication Data

US 2006/0267840 A1    Nov. 30, 2006

(51) Int. Cl.
*G01S 3/02* (2006.01)
*H04Q 7/20* (2006.01)
*H04B 1/38* (2006.01)

(52) U.S. Cl. .................... 342/450; 455/456.2; 455/561

(58) Field of Classification Search ...... 342/357.01–17, 342/450; 455/456.2, 561
See application file for complete search history.

(56) References Cited

U.S. PATENT DOCUMENTS

| | | | |
|---|---|---|---|
| 6,122,512 A | 9/2000 | Bodin | |
| 6,167,036 A * | 12/2000 | Beven | 370/331 |
| 6,195,556 B1 | 2/2001 | Reudik et al. | |
| 6,282,427 B1 * | 8/2001 | Larsson et al. | 455/456.2 |
| 6,501,955 B1 | 12/2002 | Durrant et al. | |
| 6,853,847 B2 * | 2/2005 | Shioda et al. | 455/456.1 |
| 7,031,722 B2 * | 4/2006 | Naghian | 455/456.1 |
| 7,069,023 B2 * | 6/2006 | Maanoja et al. | 455/456.1 |
| 7,155,244 B2 * | 12/2006 | Edge | 455/502 |
| 2002/0132623 A1 | 9/2002 | Kingdon | |
| 2003/0139188 A1 | 7/2003 | Chen et al. | |
| 2004/0014499 A1 * | 1/2004 | Hamalainen et al. | 455/561 |
| 2005/0014533 A1 * | 1/2005 | Cave et al. | 455/562.1 |
| 2007/0254673 A1 * | 11/2007 | Stenberg et al. | 455/456.1 |

* cited by examiner

*Primary Examiner*—Thomas H Tarcza
*Assistant Examiner*—Harry Liu
(74) *Attorney, Agent, or Firm*—Robert S. Burleigh

(57) ABSTRACT

The present invention relates to cellular mobile radio systems, particularly to systems of more than one co-sited cell/sector. A method and apparatus for high accuracy enhanced positioning not requiring more sites than one to be involved in positioning is disclosed.

16 Claims, 4 Drawing Sheets

METHOD AND SYSTEM OF POSITIONING

TECHNICAL FIELD OF THE INVENTION

The present invention relates to cellular mobile radio systems, particularly to positioning in such systems.

BACKGROUND AND DESCRIPTION OF RELATED ART

The positioning of mobile stations which make use of inherent information such as received transmission power is previously known. It is also known in prior art to make use of such information from different base stations receiving signals transmitted from a mobile station for increasing the accuracy of the positioning of the mobile station by means of triangulation.

There is an increasing demand for positioning from various administrations. Positioning is particularly requested for emergency calls. Accuracy and time to first fix are key parameters in positioning.

For GSM and UMTS there are two methods of positioning of consideration:
1. Cell Global Identity with Timing Advance.
2. Assisted GPS.

Cell Global Identity with Timing Advance is operable with GSM. It makes use of a Cell Global Identity broadcast from each base station. The Cell Global Identity consequently identifies the base station with which the mobile station is communicating or the cell on which the mobile station is camping. The distance from the base station is determined by means of a system inherent Timing Advance parameter, which compensates for propagation delay time between a base station and a mobile station. Conclusively, with Cell Global Identity with Timing Advance, the mobile station can be determined to be within a ring-shaped or arc-shaped area within a cell or cell sector, depending on the radiation pattern. FIG. 1 illustrates positioning with timing advance for a 120° sector cell with a base station <<Site>> located within a cell <<Cell/Sector>> corner. A mobile station <<MS>> is located within a TA band <<TA BAND>> of width equal to the inaccuracy of the timing advance. However, the method does not reveal where within this band the mobile station is located unless more base stations are involved in positioning. Specifically, the mobile station <<MS>> could be anywhere in the shaded area <<TA BAND>> with the same outcome when trying to position it. In UMTS, a feature corresponding to Cell Global Identity with Timing Advance is named Cell Identity with Round Trip Time.

Assisted GPS is a satellite positioning system for assisting both GSM and UMTS, as well as optionally other terrestrial radio systems, but requires a GPS (Global Positioning System) receiver and additional signaling and is not compatible with old GSM terminals. A basic assisted GPS system is illustrated in FIG. 2. GPS position information is received from three satellites <<Sat1>>, <<Sat2>>, <<Sat3>>. To reduce time to first fix, GPS positioning is assisted by course terrestrial positioning communicated from base station <<Site>>. Basically, there are two modes of assisted operation, mobile assisted and mobile based. In the former mode, the mobile station determines pseudoranges to the satellites <<Sat1>>, <<Sat2>>, and <<Sat3>> in view as determined from the course positioning. The pseudoranges are transferred to the terrestrial network, in which the mobile station position is calculated. In the latter mode of assisted operation, the mobile station determines its position from available data obtained from the base station <<site>>.

U.S. Pat. No. 6,321,083 discloses a method and arrangement for locating a telephone traffic hot spot of a cell. The timing advance provides a mobile station distance from a base station with which it is connected. Direction to the mobile station is determined by means of signal strength from two or more adjacent cells.

International Patent Application WO9728456 describes a terminal position location method using received power levels of multiple neighbor beams from an array antenna.

None of the cited documents above discloses using co-sited neighbor assisted positioning for determining a distance between a mobile station and a base station by means of timing advance and by determining a mobile station bearing from a received signal level and signal level received in a co-sited neighbor cell/sector, where preferably the signal levels are averaged levels.

SUMMARY OF THE INVENTION

With greater precision, there is less ambiguity and services can be focused. Positioning is particularly requested for emergency calls, but for investments to pay off there will most certainly also be other positioning applications. Cell Global Identity with Timing Advance is considered to be too imprecise to attract operators to most prior art applications.

The Time required for determining mobile station position should be as short as possible. Extensive signaling would drain batteries and load both radio interface between a mobile station base station, and a radio access network/core network. Further, to attract operators, the method should be applicable to existing mobile stations.

There is a problem in existing terrestrial positioning methods utilizing propagation time delay, such as E-OTD (Enhanced Observed Time Difference) or O-TDOA (Observed Time Difference of Arrival), requiring communication involving more than one site , e.g., triangulation, as this among other things involves increased signaling for exchange of timing information for determining propagation time delay. Neighboring base stations may also be under control of different base station Controllers (BSCs) or radio network controllers (RNCs). Extensive signaling also delays positioning. Upgrading of existing mobile stations may also be required.

A problem of terrestrial positioning methods utilizing received signal levels, requiring communication involving more than one site, e.g., triangulation, is that the propagation of path losses between different sites is small, which renders the distance estimates less reliable.

It is consequently an object of the present invention to enhance existing positioning methods for increased accuracy.

It is also an object to achieve a system of terrestrial positioning not requiring more than one terrestrial radio site for fast and reliable positioning.

An object is also not to require extensive operator measuring activities for achieving the enhancement.

A further object is not to require more than one co-sited neighboring cell/sector, assisting the serving cell/sector, for positioning.

Another object is to determine mobile station positions without additional signaling draining batteries.

Finally, it is an object to have an enhanced method and system of positioning compatible with existing mobile stations.

These objects are met by a method and system determining a narrow sector segment within which the mobile station is most likely located according to received signal level and co-sited neighbor cell/sector received signal level. With timing advance in addition a position can be determined accurately without involving more than a single site.

DESCRIPTION OF PREFERRED EMBODIMENTS

It has been observed that propagation path losses of neighboring cells/sectors of the same site are highly correlated, particularly for propagation paths between the site and mobile stations close to cell/sector border. In an Enhanced Cell Global Identity, ECGI, method and system, preferably with timing advance, the position is enhanced by determining a sector segment within which the mobile station is most likely located according to received signal level and a co-sited neighbor received signal level. With timing advance in addition, an accurate position can be determined without involving more than one site.

Figure 1:
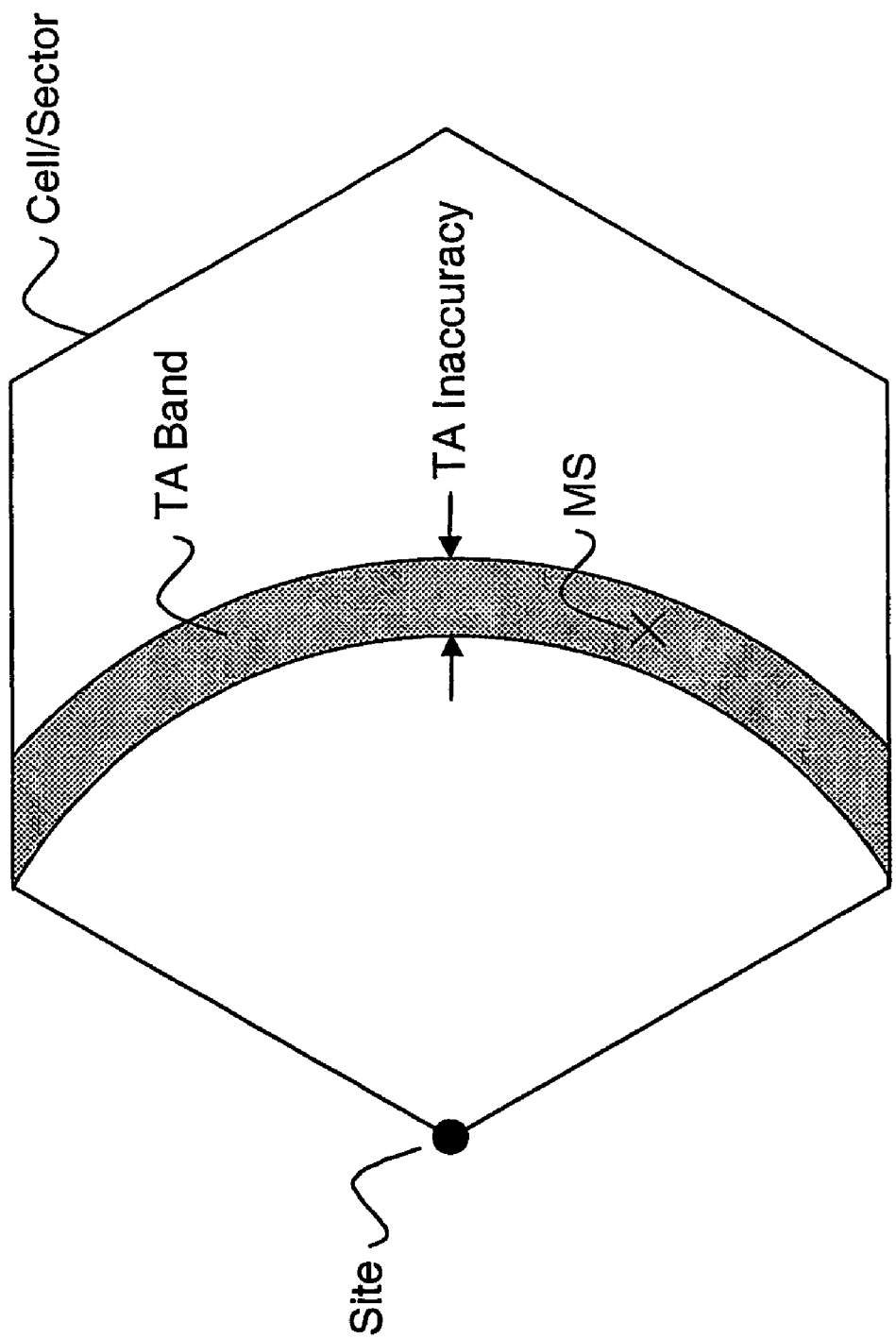
FIG. 1 illustrates positioning with timing advance for a 120° sector cell with base station <<Site>> located to a cell <<Cell/Sector>> corner according to prior art.
Figure 2:
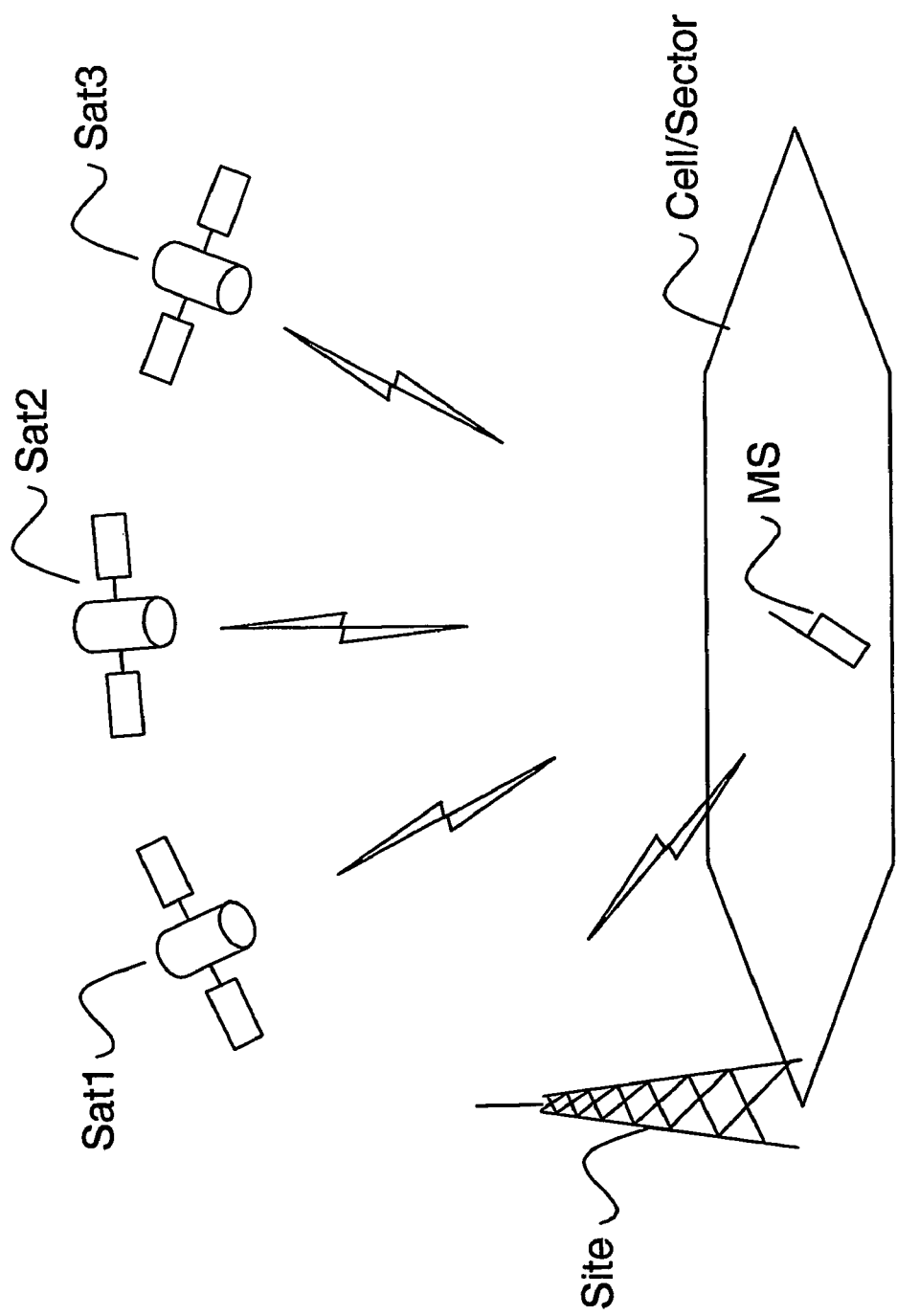
FIG. 2 displays a basic assisted GPS system according to prior art.
Figure 3:
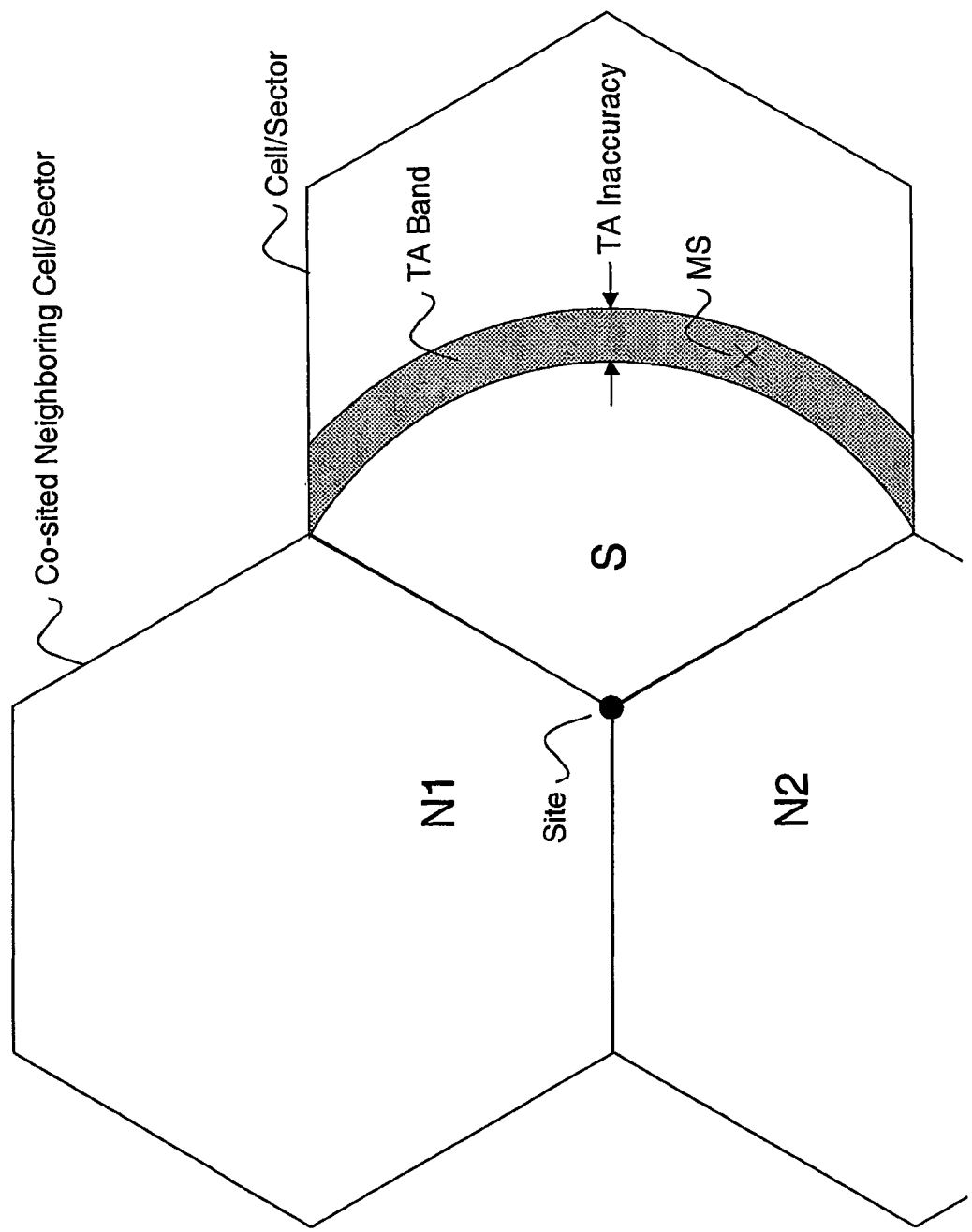
FIG. 3 illustrates ECGI according to the invention.

FIG. 3 illustrates ECGI according to the invention. The mobile station continuously performs measurements of received signal strength of neighboring cells (or base stations) for handover purposes. According to prior art specifications, a list of such one or more cells should be transferred to the network for handover control.

The ratio of respective received power in a neighboring cell/sector <<N1>> over a serving cell/sector <<N1>> determines where on the TA band <<TA Band>> a mobile station is located. For a given TA band, the greater the ratio the closer to the cell/sector border between the serving cell/sector <<S>> and the neighboring cell/sector <<N1>> is the mobile station. A second ratio can be determined for an additional co-sited neighboring cell <<N2>> to be combined with the initially determined ratio to increase accuracy. If there are more than three sectors of the site, corresponding ratios can be determined also for additional number of co-sited neighbors to be included.

As location is determined from power ratios (or differences in dB-scale) according to the invention, absolute references from field test measurements are not required. The high correlation between propagation path losses of different cells/sectors of the same site, particularly for mobile stations close to cell/sector borders, further relaxes the need of field test measurements.

Figure 4:
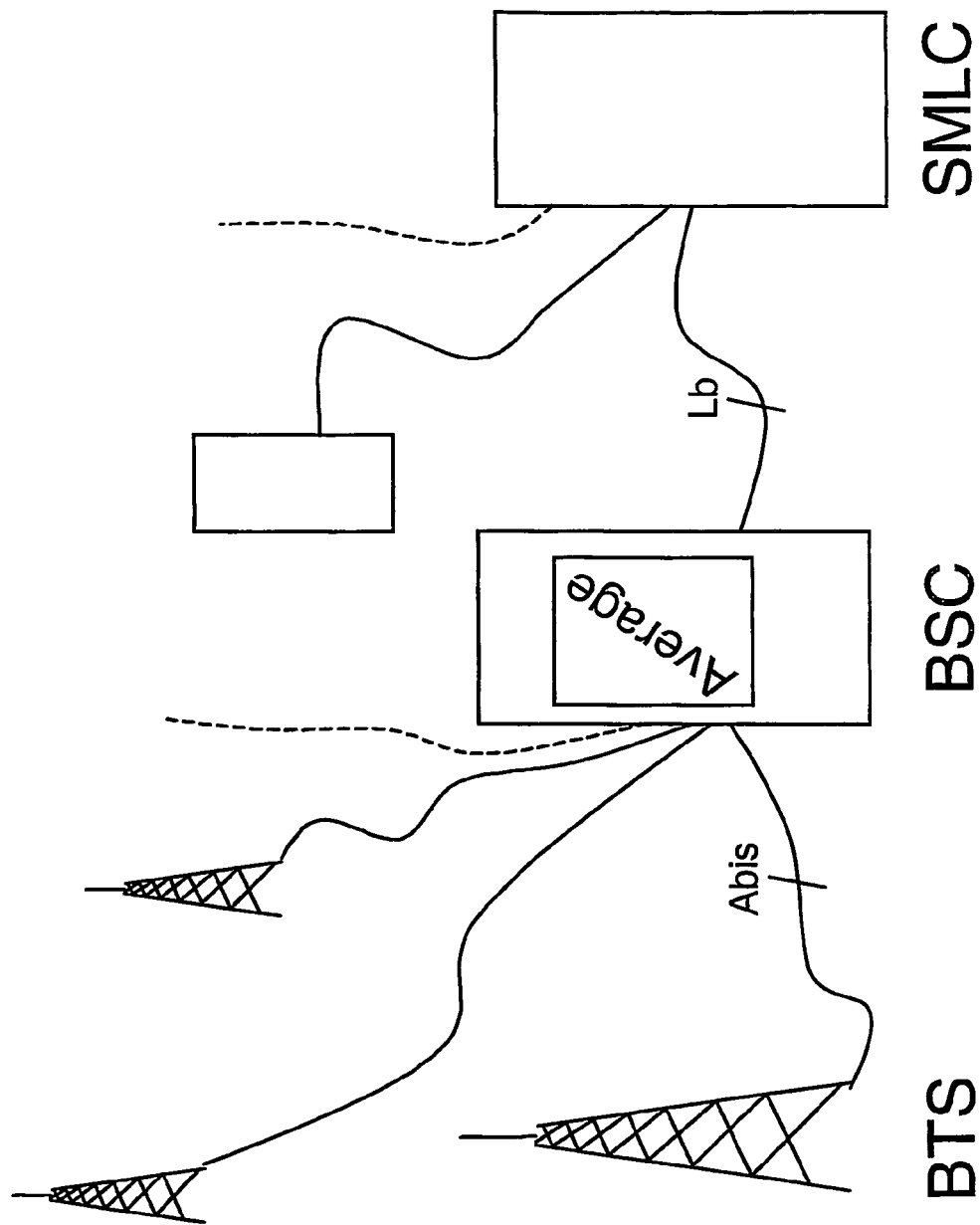
FIG. 4 schematically illustrates at least one BTS connected to a BSC over an Abis interface.

FIG. 4 schematically illustrates at least one Base Transceiver System <<BTS>> connected to a BSC (Base Station Controller) <<BSC>> over an Abis interface <<Abis>>. The Base Station Controller is connected to an SMLC (Serving Mobile Location Center) <<SMLC>> over an Lb interface <<Lb>>. The SMLC can be integrated in BSC or MSC or be a standalone device. In the latter two cases also other base station controllers are connected to the SMLC in most implementations.

In a preferred mode of the invention, for a Mobile Station to be positioned, received signal levels from the base transceiver system <<BTS>> are averaged in a locating function of base station controller <<BSC>>. The signal levels delivered to SMLC thereby become less noisy and more stable. Further, excessive transmissions in the network are avoided by averaging early in the transmission chain from BTS to SMLC. For example, in GSM the earliest feasible occurrence of averaging with sufficient processing capacity is the base station controller. A further advantage is that the Abis interface is only marginally additionally loaded as compared to a system not providing for the invention with signal levels not being averaged, are made available in the BSC according to prior art specifications. Preferably the average levels are determined in a locating function of the BSC. In addition to prior art systems, the base transceiver station <<BTS>> transmits two signaling levels, one of the served cell and one of the neighbor, instead of one. Optionally, signaling levels of more than one neighbor cell signaling level (and consequently more than two signaling levels) are transmitted. If signaling levels of both neighbors are included a bearing can be determined from a radio-difference of the individual ratios/differences or directly from a ratio/difference of neighbor signal levels. The base station includes the received signal level of the served cell/sector and at least one co-sited neighboring cell/sector. Preferably, the cell or cells to be included are selected from those signal levels of co-sited cell or cells ranked highest in the locating function. No averaging in SMLC would be required. Further, a requirement on averaging in SMLC would violate present GSM-standardization.

In one realization of the invention, signal levels from a mobile station of up to 32 neighbor cells/sectors can be averaged.

For example, when the invention is applied to GSM. the averaged level is preferably included in a BSSLAP TA Response to SMLC in response to a BSSLAP TA Request. Thus, signaling load in the Lb. or corresponding, interface would be reduced, which would reduce noise in the resulting position estimate.

A person skilled in the art readily understands that the receiver and transmitter properties of a BTS or an MS are general in nature. The use of concepts such as BTS, BSC, MSC, SMLC or MS within this patent application is not intended to limit the invention only to devices associated with these acronyms. It concerns all devices operating correspondingly, or being obvious to adapt thereto by a person skilled in the art, in relation to the invention. As an explicit non-exclusive example the invention relates to Base Station Controllers of GSM as well as Radio Network Controllers, RNCs, of UMTS.

The invention is not intended to be limited only to the embodiments described in detail above. Changes and modifications may be made without departing from the invention. It covers all modifications within the scope of the following claims.

The invention claimed is:

1. A method of positioning a radio transmitter, comprising the steps of:
   determining a distance to a receiver of known position according to a parameter reflecting propagation delay time;
   determining direction from the receiver to the transmitter from a respective parameter reflecting received signal level in a cell/sector where the transmitter is camping or being served and a signal level in one or more co-sited cells/sectors different from the cell/sector where the transmitter is camping or being served, wherein said direction is determined by forming a respective linear scale ratio of or dB-scale differences between at least one or more neighbor cells/sectors received level and a received level of the cell/sector where the transmitter is camping or being served, the received levels being related to the same site.

2. The method according to claim 1, wherein at least one of the one or more co-sited cells/sectors is an immediate neighbor of the cell where the transmitter is camping or being served.

3. The method according to claim 1, wherein said determination of transmitter positioning includes cell/sector identity.

4. The method according to claim 1, wherein the received signal level is averaged prior to forming a basis for positioning.

5. The method according to claim 4, wherein the average is formed in a network control element.

6. The method according to claim 5, wherein the network control element is an entity most closely connected to the receiver entity over a standardized interface.

7. The method according to claim 6, wherein the entity most closely connected to the receiver is a base station controller.

8. The method according to claim 6, wherein the entity most closely connected to the receiver is a radio network controller.

9. A device for positioning a radio transmitter, comprising:
    means for determining distance to a receiver of known position according to a parameter reflecting propagation delay time; and,
    means for determining direction from the receiver to the transmitter from a respective parameter reflecting received signal level in a cell/sector where the transmitter is camping or being served and signal level in one or more co-sited cells/sectors, wherein said direction to the transmitter Is determined by forming a respective ratio of the neighbor cell/sector received level and a received level of a cell/sector where the transmitter is camping or being served, the received levels being related to the same site.

10. The device according to claim 9, wherein the co-sited cell/sector is at least one of the cells/sectors being an immediate neighbors of the cell where the transmitter is camping or being served.

11. The device according to claim 9, wherein said means includes cell/sector identity determination of transmitter positioning.

12. The device according to claim 9, wherein said means forms a time average of received signal level prior to forming a basis for positioning.

13. The device according to claim 12, wherein said average is formed in a network control element.

14. The device according to claim 13, wherein the network control element is an entity most closely connected to the receiver entity over a standardized interface.

15. The device according to claim 14, wherein the entity most closely connected to the receiver is a base station controller.

16. The device according to claim 14, wherein the entity most closely connected to the receiver is a radio network controller.

* * * * *